United States Patent [19]

Seregni

[11] 4,034,619

[45] July 12, 1977

[54] MOTION REVERSAL DEVICE FOR MECHANISMS FOR COMPACT CASSETTES, MOVING SPOOL ARRANGEMENTS AND THE LIKE

[76] Inventor: Renato Seregni, Cascina Emanuela, Solaro, Milan, Italy

[21] Appl. No.: 649,883

[22] Filed: Jan. 16, 1976

[30] Foreign Application Priority Data

Jan. 22, 1975 Italy .................................. 19512/75

[51] Int. Cl.² ................. F16H 35/00; F16H 57/00; B65H 17/02
[52] U.S. Cl. .................................. 74/384; 74/404; 74/405; 242/67.4
[58] Field of Search ............ 74/384, 354, 404, 405; 242/67.4, 67.1 R, 67.3 R

[56] References Cited

U.S. PATENT DOCUMENTS

| | | | |
|---|---|---|---|
| 1,148,478 | 7/1915 | Jepson | 74/384 X |
| 3,854,670 | 12/1974 | Bertolazzi | 242/67.4 |

OTHER PUBLICATIONS

IBM Technical Disclosure Bulletin vol. 15, No. 10, Mar. 1973.

Primary Examiner—Leonard H. Gerin
Attorney, Agent, or Firm—Guido Modiano; Albert Josif

[57] ABSTRACT

A motion reversal device for mechanisms for compact cassettes, moving spool arrangements and the like, comprising a frame; two alternatively tape drive and winding hub members rotatably supported on the frame. A first gear is supported on the frame and is adapted to drive one of the hub members. A second gear is also supported on the frame and is adapted to drive the other of the hub members. A rockable train of gears has a supporting structure for rotatably supporting the gears of the train of gears. The supporting structure is pivotally supported on the frame to allow the rocking motion of the train. The rocking movement of the rockable pivotally supported structure allowing an output gear of the train to alternatively mesh with the first and the second gear. A reversible electric motor supported on the frame has a drive gear constantly in mesh with an input gear of the train of gears in all positions of the rocking train of gears. The driving gear of the reversible motor urges the rocking train of gears selectively in mesh with the first and the second gear depending on the direction of rotation of the reversible electric motor.

5 Claims, 4 Drawing Figures

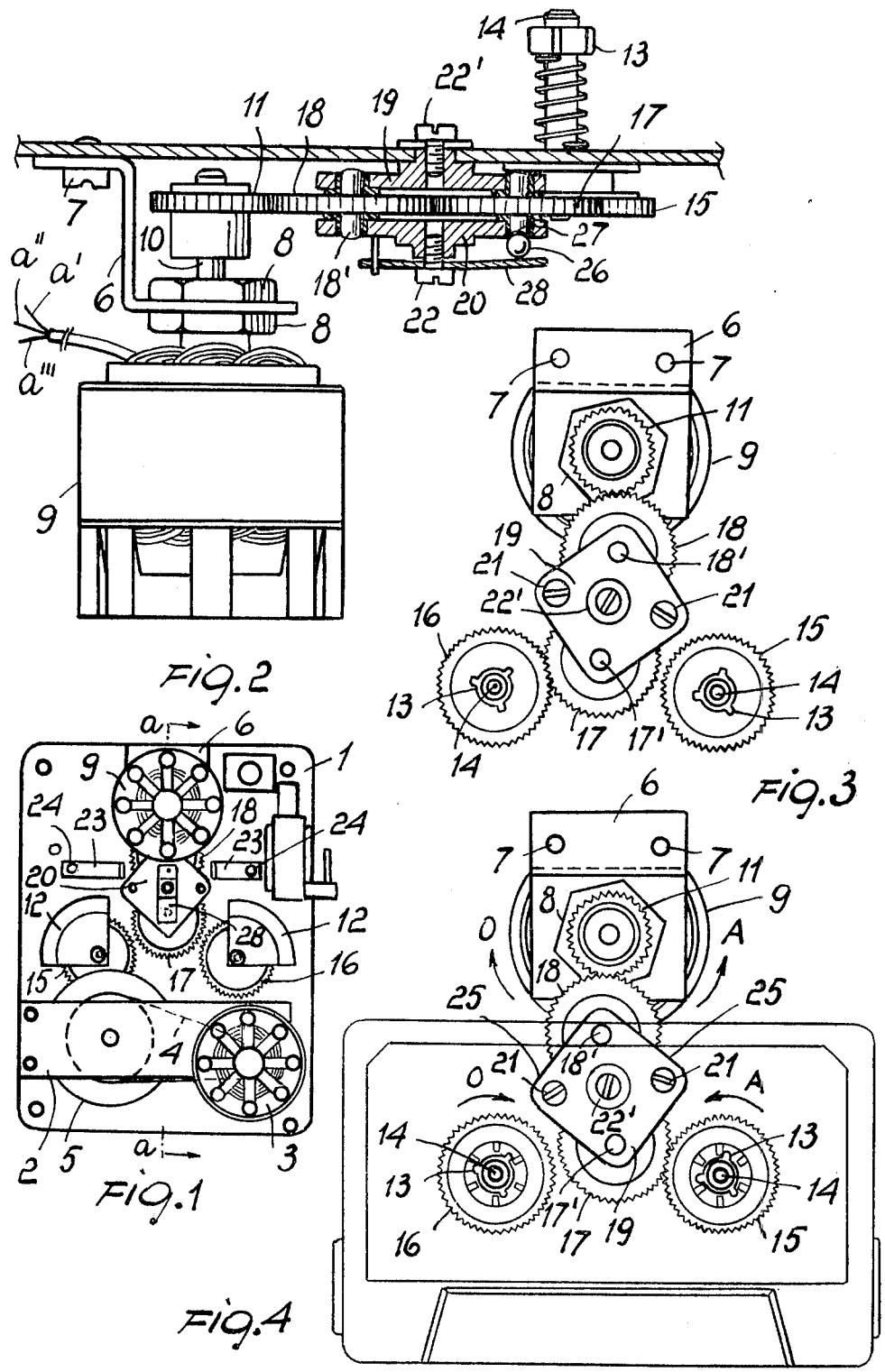

MOTION REVERSAL DEVICE FOR MECHANISMS FOR COMPACT CASSETTES, MOVING SPOOL ARRANGEMENTS AND THE LIKE

BACKGROUND OF THE INVENTION

This invention relates to a motion reversal device for mechanisms for compact cassettes, moving spool arrangements and the like.

In these devices, the magnetic tape notably travels at a predetermined constant speed when the device is in the recording or listening position, and travels at a much higher speed during rapid forward winding or rewinding of the tape on the spools. In these latter stages, the tape moves in opposite directions so that the tape becomes accumulated on the receiving spool during rapid forward winding and accumulates on the feed spool during rewinding.

Devices, particularly small and medium recorders, are available in which all movements of the internal members derive from a single electric motor rotating at a substantially constant speed in a fixed direction, the movement of the electric motor being suitably transformed by mechanisms based on complicated wheel works and lever systems operated manually.

This evidently implies the construction and insertion of a considerable number of pieces in exactly guaged relative positions, and subject to precise guiding because any defective contact by a wheel would be sufficient to stop the magnetic tape. The recorder therefore becomes costly and requires a long and difficult manufacturing process. A further disadvantage is due to the bulk of these levers and wheel works, this disadvantage becoming increasingly more serious as these types of connections become more used in small devices provided with a single electric motor. Furthermore, operation by keys which move levers by overcoming determined resistances is unpleasant as it requires a certain force, and is sometimes not practical as remote operation is not possible.

In the case of professional cassettes for small computers, devices are known in which the rapid forward winding and rewinding of the tape are obtained by two separate motors, each of which acts on a drive pivot about which the tape winds or unwinds, a third motor also being generally provided for the normal tape drive.

This arrangement largely eliminates the disadvantages of the complex motion transformation mechanisms which are characteristic of single motor devices, but the said arrangement is very costly because of the presence of three motors, and in addition the electrical supply and control circuitry for the motors is complicated and bulky.

The main object of the present invention is to provide a device for the rapid forward winding and rewinding, and take-up during recording or playback (this latter while reducing the motor supply voltage) of the tape, particularly for compact cassettes and/or moving spool arrangements and the like, in which the aforementioned disadvantages are eliminated and which is rationally conceived so as to reduce and simplify the component members of said device to the maximum extent.

A further object of the present invention is to provide a device for the rapid forward winding and rewinding of tape, and for take-up during recording or playback (this latter while reducing the motor feed voltage) which may be remotely controlled and which is of reliable operation, even without maintenance.

A further object of the present invention is to provide a cost-competitive device, easily manufactured by industries in this field.

SUMMARY OF THE INVENTION

These further objects which will be more evident hereinafter are attained by the motion reversal device for mechanisms for compact cassettes, moving spool arrangements and the like, comprising a frame; two alternatively tape drive and winding hub members rotatably supported on said frame, first gear means supported on said frame and adapted to drive one of said hub members, second gear means supported on said frame and adapted to drive the other of said hub members, said first and said second gear means being arranged at a distance from each other to leave a free space therebetween, the device being characterized in that it further comprises, a rockable train of gears including a supporting structure for rotatably supporting the gears of said train of gears, said supporting structure being pivotally supported on said frame to allow the rocking motion of said train, said train of gears having on one of its ends an output gear arranged at least partially within said free space between said first and said second gear means, the rocking movement of said rockable pivotally supported structure allowing said output gear to alternatively mesh with said first and said second gear means, said train of gears having on its opposite end an input gear, a reversible electric motor supported on said frame and having driving gear means constantly in mesh with said input gear of said train of gears in all positions of said rocking train of gears, said driving gear means of said reversible motor urging said rocking train of gears selectively in mesh with said first and said second gear means depending on the direction of rotation of said reversible electric motor.

Advantageously, gauging means are provided in said second pair of gears for adjusting and controlling the alternative engagement between the second pair of gears and the gears on said pivots, and non-removable means are fixed to said other face of the frame for adjusting the excursion of the rockable means to which the gears of said second pair are rotatably fixed.

BRIEF DESCRIPTION OF THE DRAWINGS

Further characteristics and advantages of the invention will be more evident from the description of a preferred but not exclusive embodiment of the device, illustrated by way of non-limiting example in the accompanying drawings, in which:

FIG. 1 is a diagrammatic view of the device according to the invention on that side of the frame opposite the side on which the tape is disposed;

FIG. 2 is a partial diagrammatic view of one lateral side of the device of FIG. 1;

FIG. 3 is a detailed view of the gear system of the device according to the present invention, and FIG. 4 is a diagrammatic view of the device according to the present invention, on the side on which the tape is disposed.

DESCRIPTION OF A PREFERRED EMBODIMENT

The said figures show by way of example professional cassette which is also suitable for small computers. As shown in FIG. 1, the device comprises a substantially plate-like rigid frame 1, generally of metal. A first electric motor 3 which drives a flywheel 5 by way of a belt 4 is non-removably fixed to the frame 1 by a bracket 2, the purpose of the motor 3, belt 4 and flywheel 5 being to drive the tape during recording and/or listening. A reversible electric motor 9 is also fixed to the frame by a bracket 6, better seen in FIGS. 2, 3 and 4, screws 7 and nuts 8, and in the case of the preferred embodiment is a single phase induction motor with condenser start (not shown). The shaft 10 of the motor 9 is essentially in a position symmetrical about the centre axis $a-a$ of the frame 1. A gear 11 is keyed on to the shaft 10 and consists for example of acetal copolymer or another suitable plastics material. The two drive hubs 13 are rotatably fixed to the frame 1 by sector support members 12. Two gears 15 and 16 respectively are non-removably keyed on to the supports 14 of the hubs 13 and are directly supported by the suitably shaped sector members 12, the gears 15 and 16 lying slightly below the frame 1 and in the same plane as the gear 11. The gears 15 and 16 may also be constructed of acetal copolymer and/or the like. A further pair of mutually engaging gears 17 and 18 respectively is provided for obtaining the alternative engagement between the gear 15 or 16 and the gear 11 of the motor 9. The gear 18 engages permanently with the gear 11 of the motor 9, as can be seen particularly in FIGS. 3 and 4. The gears 17 and 18 are coplanar with the preceding gears and are rotatably fixed with their spindles 17' and 18' respectively between two substantially square plate elements, an upper one 19 and a lower one 20. The two plate elements 19 and 20 are made mutually rigid by screws 21 and can freely rock about the central screw 22' as shown in FIGS. 2, 3 and 4. This rocking motion, which occurs in both directions, brings the gear 17 into engagement alternatively with the gear 15 or with the gear 16, which are rigid with the two drive hubs 13. The extent of swing of the gears 17 and 18 is limited by the two L-shaped stop and setting elements 23 (FIG. 1) fixed non-removably to the frame 1, so that they may be adjusted for example by screws 24, the swing being prevented when the corner 25 of the upper plate 19 touches the short leg of one or other L stop 23, at which moment the gear 17 is in drive engagement either with the gear 15 or with the gear 16.

The force of engagement between the gear 17 and the gears 15 and 16 is adjusted by an adjustment unit consisting essentially of a ball and spring assembly 26–28. The ball is housed in a cavity 27 in the gear 17. The resilient member or spring 28 fixed to the plate 20 by the screw 22 (FIG. 2) exerts a thrust on the ball 26 to provide improved drive coupling between the gear 17 and gears 15 or 16. In this manner the L stops 23, and the unit consisting of the spring and ball 26 and resilient element 28 form an adjustment assembly by which the coupling between the various gears may be "set".

It will be noted that the cavity 27 is provided in the hub of the gear 17 the hub being an integral part thereof. The cavity 27 is also coaxial with the hub of the gear 17 i.e. with the axis of rotation of the gear 17. The hub of gear 17 projects through the bearing hole provided in the supporting plate 20, in which the hub is journalled. In this way the ball 26 slides against the bottom of the cavity 27 and owing to the action of the spring 28 which urges it thereagainst a slight friction is created resisting the rotatory motion of the gear 17. This slight resistance creates the force which causes the unit 17, 18, 19 and 20 to swing in one or the other direction when the driving pinion 11 acts on the gear 18 in one on the other direction in conformity with the known mechanical principles.

The operation of the device according to the present invention is as follows. When it is required to rapidly wind and/or unwind the tape about the hubs 13, the reversible motor 9 is operated by making the connections between the conductors $a'$, $a''$, $a'''$ of the supply and starting condenser (not shown) as required. As shown in FIG. 4, when the motor 9 rotates clockwise, the gear 17 comes into engagement with the gear 15 by virtue of the rocking of the two plates 19 and 20 about the screw 22', the gear 15 thus rotating in an anticlockwise direction. This same position is used for taking up the tape during listening or recording, after suitably reducing the motor supply voltage 9. In contrast, when for particular requirements the direction rotation of the motor 9 is reversed, the gear 17 is brought into engagement with the gear 16, which will then rotate in a clockwise direction. It is thus seen that by an extremely simple mechanism it is possible to obtain rapid winding and/or unwinding, and take-up during listening or recording, by simply switching the direction of rotation of the motor 9 by electrical means, this switching evidently being also possible remotely. The invention attains the proposed objects. In this respect, it totally eliminates all the levers and linkages previously used for reversing the rotation of an electric motor rotating constantly in a single direction, and which transmitted the motor rotation separately to one or other of the drive hubs. All manual force is elminated in addition to these linkages, as it is now only necessary to operate keys for changing over the direction of rotation of the electric motor. Moreover, instead of two reversible electric motors for rapid winding and/or unwinding, and take-up during listening and recording of the tape, as in certain previous devices, there is now only a single motor. The device is therefore highly competitive from a purely economical point of view and is also easy to mass produce, being of simple structure and formed from elements easily obtainable commercially. The application of this tape winding and/or unwinding device to a recorder allows the overall size and weight of the recorder to be substantially reduced, which is an advantage which increases as the size of the recorder decreases.

The invention so conceived is susceptible to numerous modifications, all of which fall within the scope of the inventive idea. Thus for example the stop elements may be conceived and positioned in various ways, provided they are able to attain their purpose. Furthermore all details may be replaced by technically equivalent elements. In practice the materials used and the dimensions may be chosen according to requirements.

I claim:

1. A motion reversal device for mechanisms for compact cassettes, moving spool arrangements and the like, comprising a frame; two alternatively tape drive and winding hub members rotatably supported on the said frame, first gear means supported on said frame and adapted to drive one of said hub members, second gear means supported on said frame and adapted to drive the other of said hub members, said first and said second gear means being arranged at a distance from each other to leave a free space therebetween, the device being characterized in that it further comprises, a rockable train of gears including a supporting structure for rotatably supporting the gears of said train of gears, said supporting structure being pivotally supported on said frame to allow the rocking motion of said train, said train of gears having on one of it ends an output gear arranged at least partially within said free space between said first and said second gear means, the rocking movement of said rockable pivotally supported structure allowing said output gear to alternatively mesh with said first and said second gear means, said train of gears having on its opposite end an input gear, reversible electric motor supported on said frame and having driving gear means constantly in mesh with said input gear of said train of gears in all positions of said rocking train gears, and driving gear means of said reversible motor urging said rocking train of gears selectively in mesh with said first and said second gear means depending on the direction of rotation of said reversible electric motor.

2. Device as claimed in claim 1 characterized in that said first and said second gear means connected to the hub members, said driving gear means of said motor and said rockable train of gears all lie substantially in a single plane, this plane facing and being substantially parallel to a face of said frame, opposite to another face thereof on which said two alternatively tape drive and winding hub members are arranged.

3. Device as claimed in claim 1, characterized in that it comprises stop means for halting the rocking of said train of gears when said output gear thereof is brought alternatively into engagement with said first or said second gear means.

4. Device as claimed in claim 1, characterized in that it comprises friction means for adjusting the force urging said output gear of said rocking train of gears alternatively in mesh with said first and said second gear means, said friction means being fixed on said supporting structure of said train gears.

5. Device as claimed in claim 1, characterized in that the said electric motor has reversible electrical connections, for reversing the direction of rotation thereof.

* * * * *